(12) United States Patent
Janz

(10) Patent No.: US 9,868,928 B2
(45) Date of Patent: Jan. 16, 2018

(54) SYSTEM FOR BREWING

(71) Applicant: Nathan Robert Janz, Vancouver (CA)

(72) Inventor: Nathan Robert Janz, Vancouver (CA)

(*) Notice: Subject to any disclaimer, the term of this patent is extended or adjusted under 35 U.S.C. 154(b) by 372 days.

(21) Appl. No.: 14/266,369

(22) Filed: Apr. 30, 2014

(65) Prior Publication Data
US 2015/0093471 A1 Apr. 2, 2015

Related U.S. Application Data

(60) Provisional application No. 61/883,994, filed on Sep. 28, 2013, provisional application No. 61/902,510, filed on Nov. 11, 2013, provisional application No. 61/944,666, filed on Feb. 26, 2014.

(51) Int. Cl.
| | |
|---|---|
| *A23L 1/00* | (2006.01) |
| *C12C 11/00* | (2006.01) |
| *C12C 7/06* | (2006.01) |
| *C12C 13/10* | (2006.01) |

(52) U.S. Cl.
CPC ............... *C12C 11/00* (2013.01); *C12C 7/06* (2013.01); *C12C 13/10* (2013.01)

(58) Field of Classification Search
CPC ............ C12C 7/06; C12C 13/10; C12C 11/00
USPC ...... 99/275, 276, 348, 277.2, 278, 277, 279, 99/280, 281, 282, 283, 300, 308, 309, 99/310, 311, 312, 313; 246/11, 15, 16
See application file for complete search history.

(56) References Cited

U.S. PATENT DOCUMENTS

| | | | |
|---|---|---|---|
| 3,729,321 A | 4/1973 | Vacano | |
| 4,754,698 A * | 7/1988 | Naish | C12C 13/10 99/275 |
| 5,283,854 A * | 2/1994 | Schiebelhuth | A47J 31/545 219/432 |
| 5,364,639 A | 11/1994 | MacLennan et al. | |
| 5,852,965 A * | 12/1998 | Kim | A23C 11/103 99/281 |
| 6,032,571 A | 3/2000 | Brous et al. | |
| 8,601,936 B2 | 12/2013 | Williams et al. | |
| 2005/0279214 A1 | 12/2005 | Blichmann | |
| 2010/0162734 A1 * | 7/2010 | McCormick | F25D 31/006 62/56 |

FOREIGN PATENT DOCUMENTS

| | | |
|---|---|---|
| EP | 1591516 | 2/2005 |
| JP | 10-313848 | 2/1998 |
| WO | WO 99/50383 | 10/1999 |
| WO | WO 2008/020760 | 2/2008 |

* cited by examiner

*Primary Examiner* — Phuong Nguyen
(74) *Attorney, Agent, or Firm* — Sheridan Ross P.C.

(57) ABSTRACT

A fermenter is provided that heats and ferments a beverage feed material, such as grain and water, and a mashing device having a porous and permeable bottom to be positioned in the fermenter during heating to form an intermediate beverage feed material, such as a wort.

19 Claims, 15 Drawing Sheets

SYSTEM FOR BREWING

CROSS REFERENCE TO RELATED APPLICATION

The present application claims the benefits of U.S. Provisional Application Ser. Nos. 61/883,994, filed Sep. 28, 2013, entitled "Improved Boil Kettle", and 61/902,510, filed Nov. 11, 2013, entitled "Improved Vessel", and 61/944,666, filed Feb. 26, 2014, entitled "Device for Mashing Grain", each of which is incorporated herein by this reference in its entirety.

FIELD

The disclosure relates generally to improved equipment designs and methods for making fermented beverages, such as wine and beer, and particularly to a fermenter capable of boiling and/or chilling intermediate beverage formulations.

BACKGROUND

It is well known in the beer brewing industry, particularly in the homemade or small-scale beer making industry that the method for making beer may generally include four steps, which may occur in four different vessels.

The first step is heating of water. This heating may occur in a vessel sometimes referred to as a 'hot liquor tank' or 'hot liquor kettle'. Water in the kettle may be heated by such means as a flame under the kettle or electric element under or in the kettle. The heated water in the hot liquor kettle may serve functions such as providing a ready source of warm water for mashing, providing a source of warm water to rinse the grain in order to remove sugars after mashing is completed, and acting as a reservoir for regulating the temperature of the mashing process. The hot liquor kettle can regulate the temperature of the mash by the use of a coil or tube, often made from copper or stainless steel or other heat-conductive material that is immersed in the reservoir of warmed water. Cooler liquid from a mash tun is circulated out from the mash tun through the coil or tube immersed in the reservoir of warmer water, picking up heat from the warm water through the walls of the coil or tube and returning to the mash tun where it is combined with the rest of the liquid, raising the temperature in the mash tun to the desired temperature.

The second step is mashing the grain, which may occur in a vessel referred to as a 'mash tun'. Grain is combined with warm water in the mash tun to allow enzymes to interact with carbohydrates in the grain, producing a sweet liquid called 'wort'. The wort is transferred to the boil kettle for boiling. A mash screen in the mash tun holds the grain back so that it is not transferred to the boil kettle along with the wort.

The third step is boiling the wort, which may occur in a vessel referred to as a 'boil kettle'. Reasons for boiling of wort may include sanitizing the wort, reducing the volume of wort, and altering the flavor of the wort. Following the boiling of the wort, it needs to cool on its own or be chilled to a lower temperature before yeast can be added.

The fourth step is fermenting the wort to produce beer. This may occur in a vessel, which is called the 'fermenter'. Fermentation may occur in a cylindro-conical vessel with cylindrical sides and conical base. Such a vessel may also be referred to as a 'conical fermenter'.

The production of fermented beverages, such as beer, generally adheres to the following procedures or methods.

During the mashing process, it is generally recognized that it is desirable to regulate the temperature of the liquid during the mashing process to achieve such ends as optimizing the enzyme activity. Heat is constantly lost from the mash tun to the surrounding environment and may need to be replaced to keep the desired or target temperature in the mash tun. The temperature in the mash tun may be raised by employing a heat source directly underneath the mash tun, or by circulating liquid out of the mash tun and heating it before it is returned to the mash tun. It is also known that it is often desirable to provide a means of agitating or moving the grain or liquid in the grain bed so that the enzymes are provided optimal exposure to and interaction with the complex carbohydrates and to help keep the mash more fluid. This increases the efficiency of the conversion from complex carbohydrates into less complex sugars and allows for optimal recovery of sugar from the grain. And it is also know that prior to transferring to the boil kettle, the wort is often circulated for a suitable period of time through the grain, past a screen that holds the grain back, out of the mash tun, and then back into the mash tun on the far side of the grain. This process, also known as lautering, can serve purposes such as changing enzyme interaction with carbohydrates, leading to altered conversion of complex carbohydrates into sugars that can be digested by brewer's yeast, and clarifying the wort by removing suspended grain particulate or sediment by filtering it out in its passage through the grain.

In the homemade or small-scale beer making industry, mashing generally occurs in a vessel that is dedicated to mashing often called a mash tun. The mash tun is separate from other vessels such as the hot liquor tank that is used to heat water, the boil kettle that is used to boil the wort, and the fermenter that is used to ferment the wort into beer. Once the mashing is complete, the wort may be transferred to the boil kettle where it is boiled in preparation for fermenting.

One notable exception to the above method for mashing is the method or process sometimes referred to as 'brew in a bag' or by the acronym 'BIAB' that entails placing a porous bag, such as might be made from nylon mesh, directly in the pot or kettle. This might be the same pot or kettle in which boiling of the wort will later occur. The bag is filled with grain and the kettle filled with water. The top of the bag is secured in some fashion such as attaching it to the top of the pot or a hook above the pot so that grain does not escape from inside the bag. A heat source may be applied at the bottom of the pot to warm the temperature of the liquid inside the pot or kettle. A mash screen may be inserted at the bottom of the pot or kettle, to keep the nylon bag from melting on the pot heat source. The mashing occurs in this vessel and when complete, the bag is removed from the pot or kettle. As the bag is withdrawn, wort flows out of the bag, remaining in the pot, and the mesh bag removes the majority of the grain with it. The wort remains in the vessel where it will then be boiled in preparation for fermentation. This method or process is desirable by some for reasons that might include taking up less space, being considered easier to execute, and requiring less equipment than the traditional methods, since in addition to a pot or kettle, a separate mash tun and hot liquor kettle are not necessary.

After the mashing process is completed, the sweet liquid generally referred to as wort may be transferred to a vessel called a boil kettle. It is well known in the beer brewing industry, particularly in the homemade or small-scale beer making industry that a reason for boiling of wort is to sanitize the wort. It is also known that following the boiling of the wort, it needs to be chilled to a lower temperature before yeast can be added. And thirdly, it is also known that for many beer types it is important to maintain sanitary conditions throughout the chilling period to reduce or eliminate possible sources of contamination, which might spoil the beer.

In the homemade or small-scale beer making industry, wort is generally boiled in a vessel that is separate from the fermentation vessel. This vessel is generally referred to as the boil kettle. The boil kettle shape is generally with side walls of cylindrical shape with a flat bottom joined to side walls by a radiused corner. This shape is generally similar to what are sometimes referred to as soup or stock pots. Ports or fittings can be added to the boil kettle for purposes such as inserting apparatus for reading the temperature or addition or removal of liquid.

Once the wort has been boiled, it needs to be chilled to a temperature that is suitable for the healthy growth of yeast. It needs to be chilled in a reasonable amount of time to reduce the potential for contamination.

There are at least three methods that might be employed by brewers in the homemade or small-scale brewing industry for the chilling of wort once boiling is completed. In the first, the boil kettle itself can be physically transported into a chilling media, such as an open-air cold-water bath, which can be made in a sink or tub. A chilling media such as cold tap or ice water is kept surrounding the metal boil kettle and heat is transferred from the hot wort to the chilling media through the metal walls, cooling the wort in the process.

A second method for the chilling of wort is to insert in the wort a tube, often coiled, and often made of copper or stainless steel, through which a chilling media such as cool water is ran. As the chilling media passes through the immersed tube, heat is transferred from the wort to the water through the walls of the metal tube, cooling the wort in the process.

A third method to chill wort is to use a heat exchanger located outside the boil kettle. A hose or pipe is connected from the boil kettle to the heat exchanger and a second hose or pipe is connected from the heat exchanger to the vessel where fermentation will take place. A second set of hoses transfers a chilling media to and from the heat exchanger. The hot wort leaves the boil kettle through the hose or pipe and enters the heat exchanger where the wort passes on one side of a metal dividing wall or partition (often made of copper) and a chilling media (often water) passes on the other side of the dividing wall or partition. Heat is transferred from the hot wort to the cooling media through the dividing metal wall or partition.

Once the wort has been chilled, it is transferred to the fermenting vessel. In the homemade or small-scale brewing industry, the most common fermentation vessels are sealable plastic buckets, glass carboys, or cylindro-conical metal vessels with cylindrical side walls and conical base. Prior to the addition of wort, the fermentation vessel may need to be sanitized so that undesirable microbes do not contaminate the freshly chilled wort. Various means for sanitizing can be used, but the most commonly used in the homemade or small-scale beer making industry is the use of physical or chemical cleaning followed by the introduction of chemical sanitizers. The use of a chemical cleaner or sanitizer may present a drawback since if it is not thoroughly rinsed off, it can end up in the beer as an off flavor or toxin.

The existing equipment and/or methods for making a fermented beverage, such as beer, can suffer from one or more drawbacks. First, the equipment and/or methods can require plural vessels to complete the process of mashing, boiling, chilling and fermenting (hot liquor tank, mash tun, boil kettle, chiller, fermenter). This can add cost and necessitate additional storage space when not being utilized for brewing. Second, the equipment and/or methods can require close supervision or automation at points of the process to regulate temperature, liquid flows between vessels, and liquid levels. Third, the equipment and/or methods can require transferring of liquid between vessels during the brewing process, which can be a messy and time consuming process. Fourth, the equipment and/or methods may not provide an adequate mechanism to filter grain particulate to prevent it from passing into the boil kettle, leading to undesirable compounds in the wort. Fifth, the equipment and/or methods may not provide an easy means of maintaining precise temperature in the mash tun. Sixth, the equipment and/or methods can require the dangerous physical moving of a boil kettle containing hot wort. Seventh, in the equipment, the lid cannot be securely placed on the boil kettle during chilling due to the entry of tubes for chilling media, and the sanitized wort is therefore exposed to the open air and can become contaminated by airborne pathogens. Eighth, there can be an increased risk for compromising sanitation as the additional hardware necessary for chilling the wort may introduce pathogens to the sanitized wort. Ninth, the equipment and/or methods can require additional cleaning and setup which is time consuming and costly. Tenth, the equipment and/or methods can require chemical sanitizing of the fermenting vessel, which may lead to off-flavors in the beer.

SUMMARY

These and other needs are addressed by the various aspects, embodiments, and/or configurations of the present disclosure. A fermenter can heat and ferment a beverage feed material, such as grain and water, and a mashing device can have a porous and permeable bottom and be configured to be positioned in the fermenter or a boil kettle during heating to form an intermediate beverage feed material, such as a wort.

A fermenting device for fermenting a beverage can include:

(a) a substantially cylindrical sidewall structure;

(b) a substantially conically-shaped bottom, the sidewall structure and bottom defining a reservoir to receive a beverage feed material for fermentation within the reservoir;

(c) a lid configured to engage a top of the substantially cylindrical sidewall structure and substantially seal the reservoir; and (d) a heating port to receive a heating medium to heat the feed material.

In a first operating mode, the beverage feed material is heated by the heating medium to form an intermediate feed material, and, in a second operating mode, the intermediate feed material is cooled by the cooling medium, while in contact with yeast, to ferment the intermediate feed material.

A method can include the steps of:

(a) providing a fermenter comprising a sidewall structure, a bottom, the sidewall structure and bottom defining a reservoir to receive a beverage feed material for fermentation within the reservoir, and a lid configured to engage a top of the substantially cylindrical sidewall structure and substantially seal the reservoir;

(b) heating the beverage feed material while in the reservoir to form a wort;

(c) contacting the wort with a yeast; and (d) chilling the wort and yeast while in the reservoir to form a fermented beverage.

The sidewall structure and/or bottom can have an inner and outer wall to define a heating and/or cooling cavity to receive a heating or cooling medium to heat or cool the feed material in the reservoir.

The heating port can be in communication with the reservoir.

The heating medium can be an electrically resistive structure and/or heat exchange coil.

The heating and/or cooling cavity can cool the feed material in the reservoir.

An entry port for the cooling medium can pass through the outer wall but not through the inner wall.

The beverage feed material can include water and grain.

The intermediate feed material can be wort, and the beverage beer.

The heating medium can be a heated fluid.

The heating and/or cooling cavity can be for heating the feed material in the reservoir.

The heating port for the heating fluid can pass through the outer wall but not through the inner wall.

A mashing device can be positioned in the device during the first operating mode.

The mashing device can have a reservoir comprising grain, a porous and permeable surface comprising openings capable of passing water from the reservoir of the fermenting device to the reservoir of the mashing device but not capable of passing the grain, and an outlet port to remove water from the reservoir to recycle to the reservoir in the fermenting device.

The lid can include a port for exit of gases, a bottom port for removal of sediment from the reservoir and an upper port for removal of a fermented beverage from the reservoir when fermentation is substantially completed.

The upper and bottom ports can be different from the heating port.

A system can include:

(a) a boil kettle having a sidewall and bottom defining a reservoir to receive and heat water positioned in the reservoir; and (b) a mashing device positioned in the boil kettle and having a grain reservoir comprising grain, a porous and permeable surface comprising openings capable of passing water from the reservoir of the boil kettle to the reservoir of the mashing device but not capable of passing the grain, whereby the water is heated while in contact with the grain to form an intermediate feed material.

The intermediate feed material can be wort.

The wort can be subsequently fermented in the presence of a yeast to form beer, and one or more of the sidewall and bottom have an inner and outer surface defining a cavity therebetween.

The cavity can be a heating and/or cooling cavity to receive a heating or cooling medium to heat or cool the feed material in the reservoir.

A heating port can be in communication with the reservoir.

The heating medium can be an electrically resistive structure and/or heat exchange coil.

The heating and/or cooling cavity can be for cooling the feed material in the reservoir.

An entry port for the cooling medium can pass through the outer wall but not through the inner wall.

The heating medium can be a heated fluid.

The heating and/or cooling cavity can be for heating the feed material in the reservoir.

The heating port for the heating fluid can pass through the outer wall but not through the inner wall.

The present disclosure can provide a number of advantages depending on the particular aspect, embodiment, and/or configuration. The methods and apparatus of this disclosure can not only be used in the homemade or small-scale brewing industry but also have reduced equipment and space requirements for the processes of heating, mashing, boiling, chilling, and fermenting. The plural of activities of boiling, chilling and fermenting can be completed in one vessel and one assembly for such. By inserting the mashing device inside the boiling device, there can be a reduced equipment requirement, since the boiling device acts in the capacity of a hot liquor kettle and mash tun and boil kettle. Since the entire process can occur inside the improved fermenter, monitoring of water levels is not necessary, as liquid is not transferred among vessels. With mashing, boiling, chilling and fermenting completed inside the improved fermenter, the wort may not need to be physically removed from one vessel and transferred into another but can remain in the same place where the boiling occurs, avoiding additional equipment. The solid side wall structure of the mashing device can ensure that a consistent temperature is maintained throughout the grain by recirculating the wort through the properly functioning grain bed, or by regulating the temperature of the liquid surrounding the side wall structure inside the improved boil kettle or fermenter. The solid side wall structure of the mashing device can ensure that benefits can be achieved such as but not limited to the forming of a proper grain bed and filtering grain particulate to keep it out of the boiling process where it might contribute undesirable attributes including cloudiness and off-flavors to the final product. The solid structure of the mashing device can ensure that the grain bed is not disturbed when withdrawn from the boil vessel leading to minimal grain particulate in the boiling process and thereby reducing the possibility of it contributing undesirable attributes including cloudiness and off-flavors to the final product. The chilling mechanism being built into the walls of the device can obviate additional chilling hardware, saving time and money. The chilling mechanism being built into the walls of the device where boiling occurs can avoid physical movement of the boiling device to chill the wort but can remain in the same place where the boiling occurs, avoiding any need for the dangerous physical moving of a vessel containing hot liquid. With chilling occurring directly through the side wall structure of the device where boiling occurs, the lid can be securely placed on the boiling device during chilling, preventing exposure to the open air, preventing contamination by airborne pathogens. With the activities of boiling, chilling, and fermenting all contained within one vessel, there can be a greatly reduced risk for compromising sanitation as additional hardware for chilling or fermenting is not necessary. Since there are fewer pieces of equipment necessary for the brewing process, there can be reduced cleaning and setup, which can be messy, time-consuming, and costly. With the capability for boiling of the wort directly in the fermenter, the fermentation vessel can be fully sanitized by the heat of the boil, obviating the need for chemical sanitation prior to fermentation, thereby saving time and money and possible off-flavors in the beer.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

The Mash Device

Figure 1:
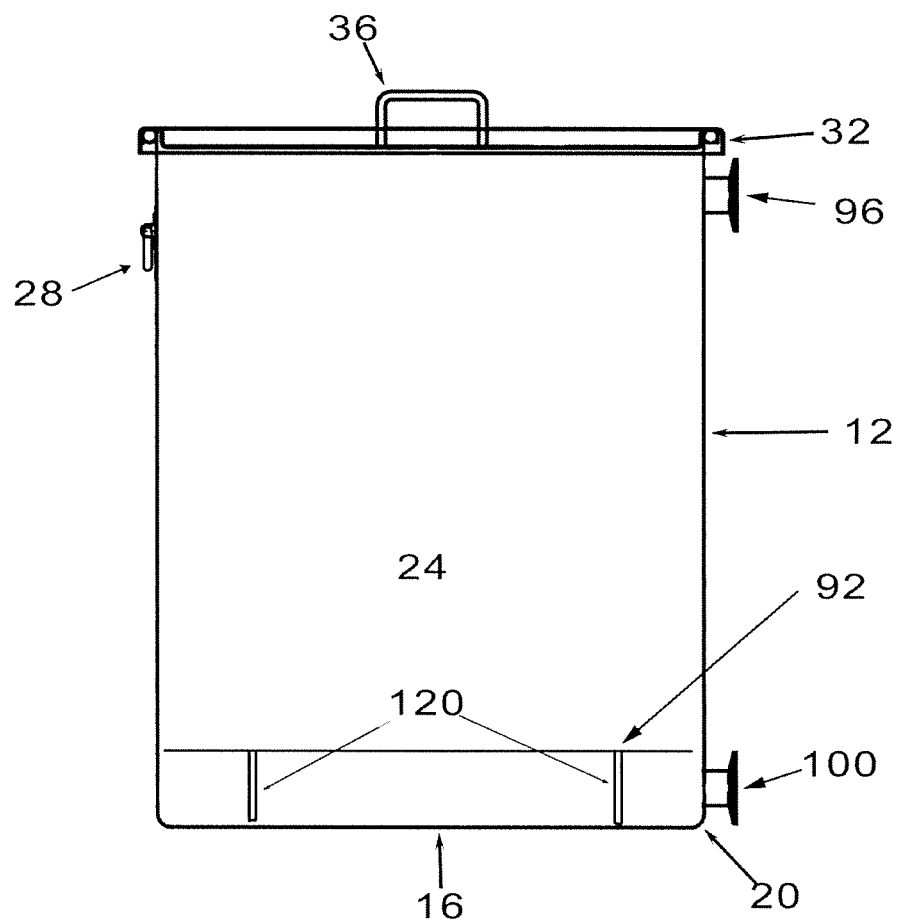
FIG. 1 is a cross-sectional view of a mash tun according to the prior art and similar in design to commercially available mash tuns used by brewers, particularly in the homemade or small-scale beer making industry.

FIG. 1 shows a mash tun, which has a construction of a rigid, heat-conductive material such as copper or stainless steel. The mash tun can have a cylindrical configuration and includes a top or lid 32 and a handle 36 attached to the lid. Other configurations can be used, such as rectangular, hexagonal, and the like. The mash tun has a side wall structure 12 and a bottom 16 with a radiused portion 20 connecting the two. The bottom 16, radiused portion 20, and side wall structure 12 form a reservoir 24 which can contain liquid and grain. A porous metal disc or a screen 92 is held in place by a support mechanism 120, slightly above the inside bottom of the vessel. The metal disc or screen 92 is of diameter just slightly smaller than the diameter of the inside of the mash tun so that it can be easily removed for cleaning. The metal disc or screen holds the grain above it, preventing grain from passing out the lower port 100 in the side wall structure 12, but allows liquid to be drawn down through the grain, passing through the metal disc or screen 92 and out the port 100 in the side wall structure 12 below the space below the metal disc or screen. During the procedure called vorlauf, wort is drawn out of the port 100 at the bottom of the mash tun underneath the mash screen 92 and reintroduced to the mash tun through a port at the top 96. There are handles 28 attached to the side wall structure 12 for lifting the vessel. This design of the mash tun is similar to the design of commercially available mash tuns as used by brewers, particularly in the homemade or small-scale beer making industry.

Figure 2:
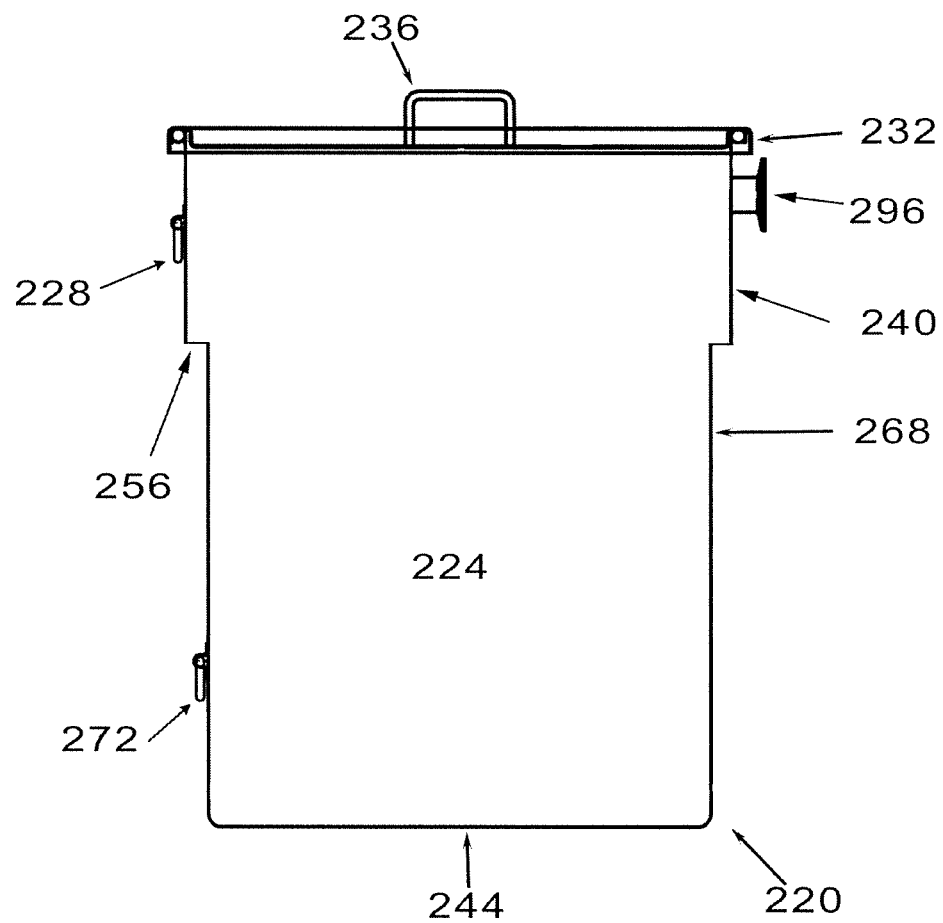
FIG. 2 is a cross-sectional view of an improved mash screen device, which can be inserted in another vessel.

FIG. 2 is one embodiment of a mashing device, which has a construction of a rigid, heat-conductive material, such as copper or stainless steel. The device can have a cylindrical or other configuration and includes a top or lid 232 and a handle 236 attached to the lid. The device has an upper side wall structure 240 and lower side wall structure 268 on each side with the diameter of the lower portion of the structure being less than the diameter of the upper structure. The two structures are joined by a substantially horizontal band of metal 256. The device has a bottom 244 with a radiused portion 220 connecting the lower side wall structure 268 and bottom 244. The bottom 244, radiused portion 220, and side wall structures 240, 268, and horizontal band 256 form a reservoir 224 which can contain liquid and grain. The bottom 244 is not solid but is porous, such that liquid can pass through into a vessel below while grain will be held back. There is a port 296 in the upper side wall structure 240, which can be used for circulating the wort back into the device when it has been withdrawn from the vessel below. There are handles 228 attached to the upper side wall structure 240 for lifting the device. There are also drop handles 272 attached to the lower side wall structure 268, which can be used to lift the device or support it when resting on the vessel below while rinsing the grain.

Figure 3:
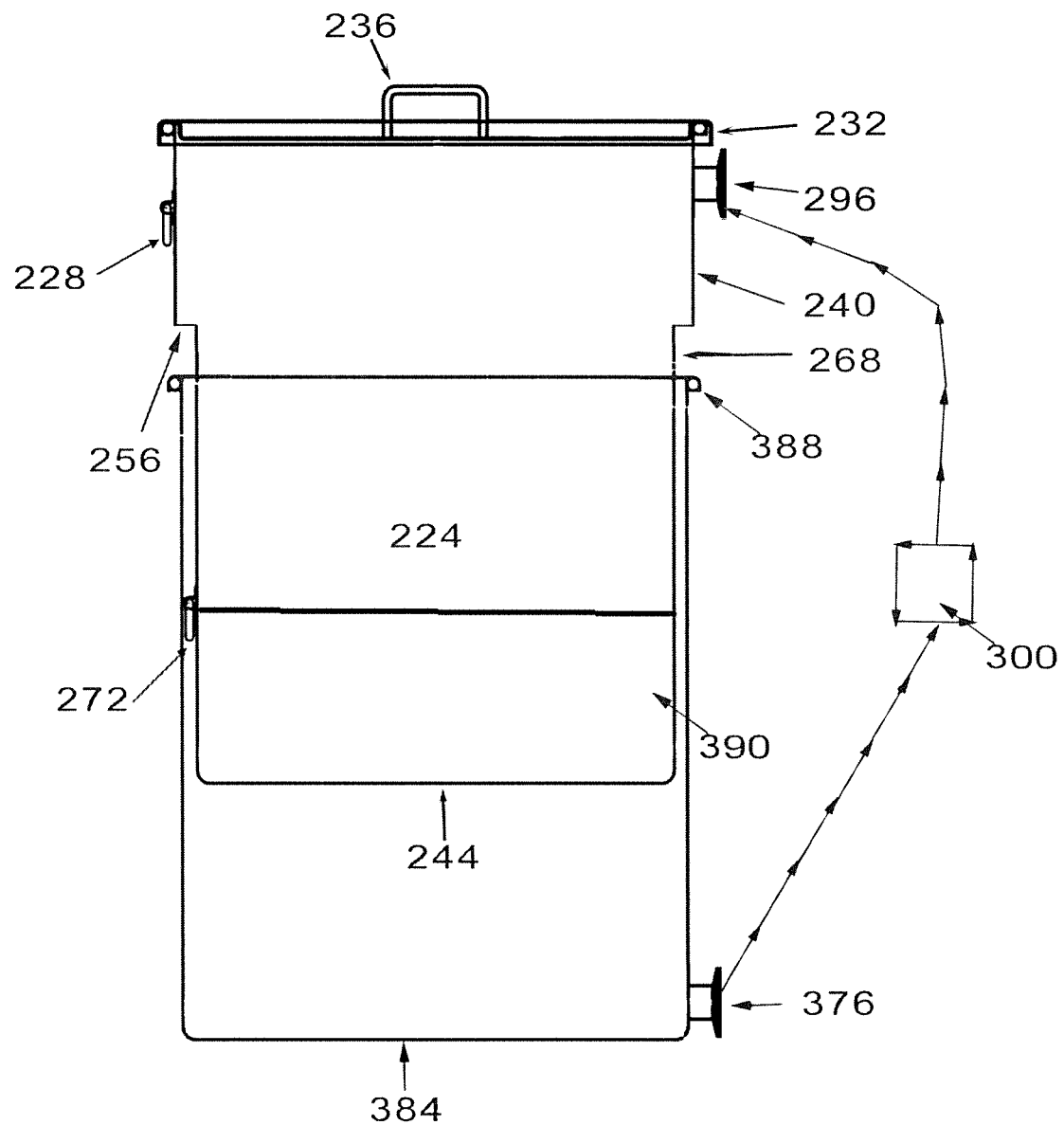
FIG. 3 is a cross-sectional view of the device for mashing grain, inserted in a boil kettle with the boil kettle being shown in cross-section.

FIG. 3 shows one embodiment of a mashing device inserted in a boil kettle. The horizontal band of metal 256 in the mashing device can be used for resting the device on the upper rim 388 of the boil kettle while the grain, or feed material 390 in the lower portion is submerged in water during mashing. This prevents the device from sitting on the bottom of the boil kettle 384, which could impede the flow of wort through the porous bottom 244 of the device during vorlauf, and it is one way to ensure that the top of the device remains above the top of the boil kettle for easier withdrawal of the device when mashing is completed. Wort can be drawn out of the port 376 at the bottom of the boil kettle and circulated back into the device through the port 296 in the upper side wall structure 240 of the device using a pumping device 300. The lower drop handles 272 attached to the lower side wall structures 268 can swing up when they are needed for lifting or resting on the upper rim of the boil kettle 388 in order to let the wort drain from the grain into the boil kettle through the porous bottom of the device 244. The handles 272 can also drop down when not in use so that the lower side wall structure 268 of the device can fit inside the boil kettle. The temperature of the mash can be regulated by means including applying heat under the boil kettle, inserting a heat source in the space inside the boil kettle but underneath the mashing device, or by heating the wort as it is circulated out the bottom of the boil kettle and returned to the mashing device above the grain.

Figure 4:
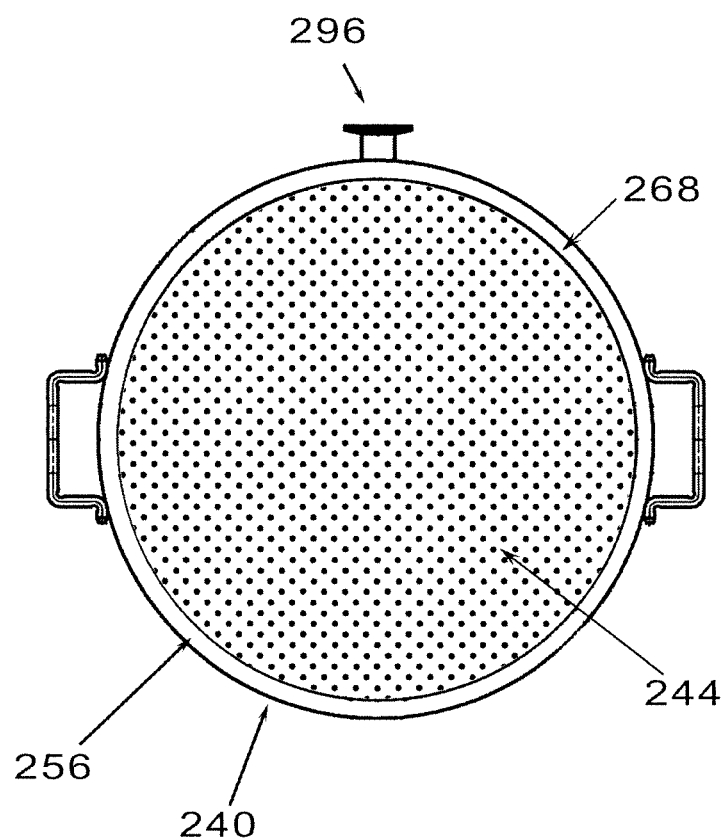
FIG. 4 is a top view of a device such as is here disclosed for mashing grain.

FIG. 4 is a top-down perspective of one embodiment of the mashing device, demonstrating one configuration for the top port 296 for introducing wort back into the device near the top, the connecting horizontal band 256 joining the upper 240 and lower 268 side wall structures and the porous bottom 244 of the device.

The Boil Kettle

Figure 5:
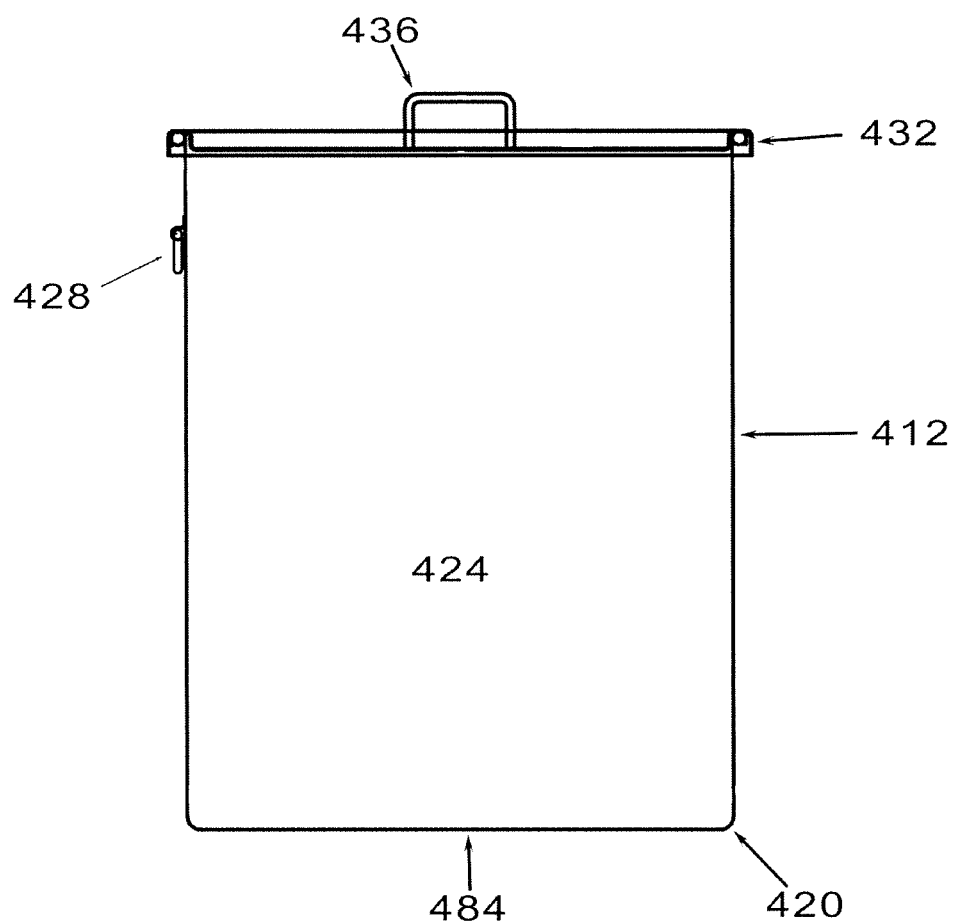
FIG. 5 is a cross-sectional view of a boil kettle according to the prior art and similar in design to commercially available boil kettles as used by brewers, particularly in the homemade or small-scale beer making industry.

FIG. 5 shows a boil kettle, which has a construction of a rigid, heat-conductive material such as copper or stainless steel. The boil kettle can have a cylindrical or other configuration and includes a top or lid 432 and a handle 436 attached to the lid. The boil kettle has a side wall structure 412 and a bottom 484 with a radiused portion 420 connecting the two. The bottom 484, radiused portion 420, and side wall structure 412 form a reservoir 424 which can contain wort. There are handles 428 attached to the side wall structure 412 for lifting the vessel. This design of the boil kettle is similar to the design of commercially available boil kettles as used by brewers, particularly in the homemade or small-scale beer making industry.

Figure 6:
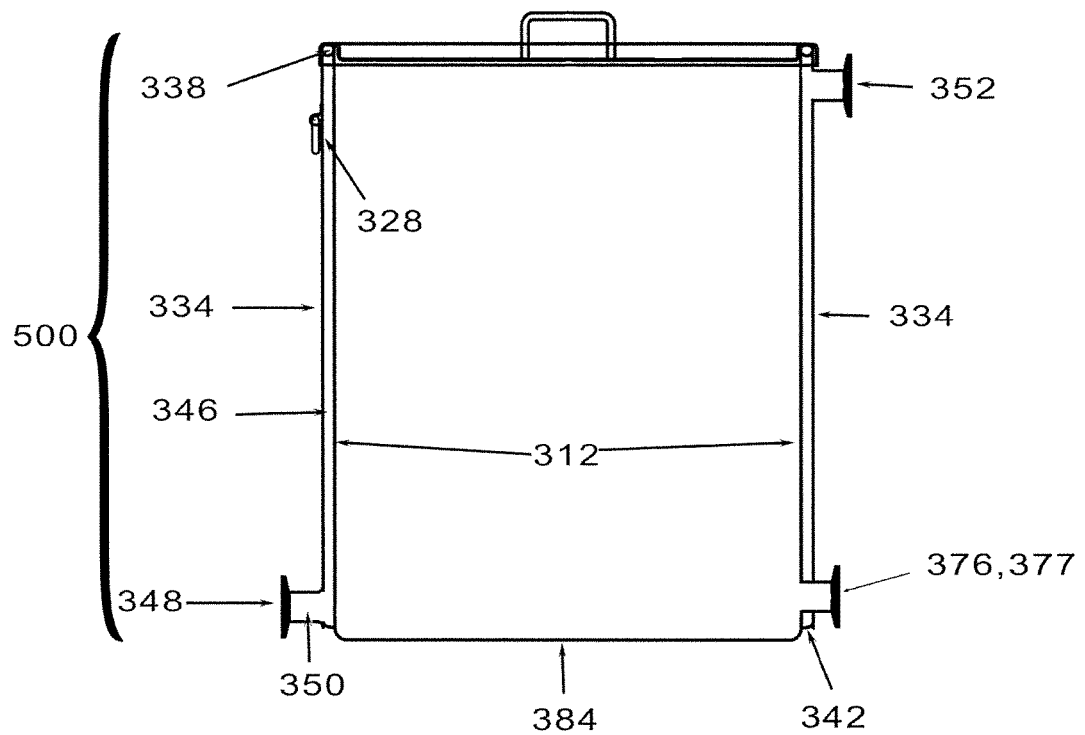
FIG. 6 is a cross-sectional view of an improved boil kettle with an outer wall, or jacket, on the sides of the vessel for the cooling of liquid.

FIG. 6 shows one embodiment of an improved boil kettle 500, demonstrating that outside, and surrounding the sides 312 of the boil kettle is a second or outer wall or jacket 334 that has been attached at top 338 and bottom 342 to the outsides of the inner side wall structure 312 of the boil kettle by a method such as welding. The second or outer wall 334 is of construction similar to the inner wall 312 and is sealed at the top 338 and bottom 342 forming a sealed cavity 346 that surrounds the inner wall. There are handles 328 affixed to the second or outer wall structure. The second wall 334 is a sufficient distance to allow the easy passage of a chilling media 350 such as water in the sealed cavity 346 between the inner 312 and outer wall 334. A width is chosen for the sealed cavity 346 that will allow for maximum interaction of chilling media against the inner wall 312 of the cavity to provide for maximum heat transfer from wort contained in the reservoir 324 to inner wall 312 to chilling media. The second or outer wall 334 has an entry port 348 for the introduction of chilling media into the cavity 346 and an exit port 352 for chilling media to leave the cavity 346. The entry port 348 is typically near the bottom along the side and the exit port 352 typically near the top along the side, 180 degrees around the pot from the entry port. Ports 376, 377, which are in communication with the interior cavity defined by the inner wall, can be added for the removal of wort and/or the insertion of a heating element to boil the wort.

Figure 7:
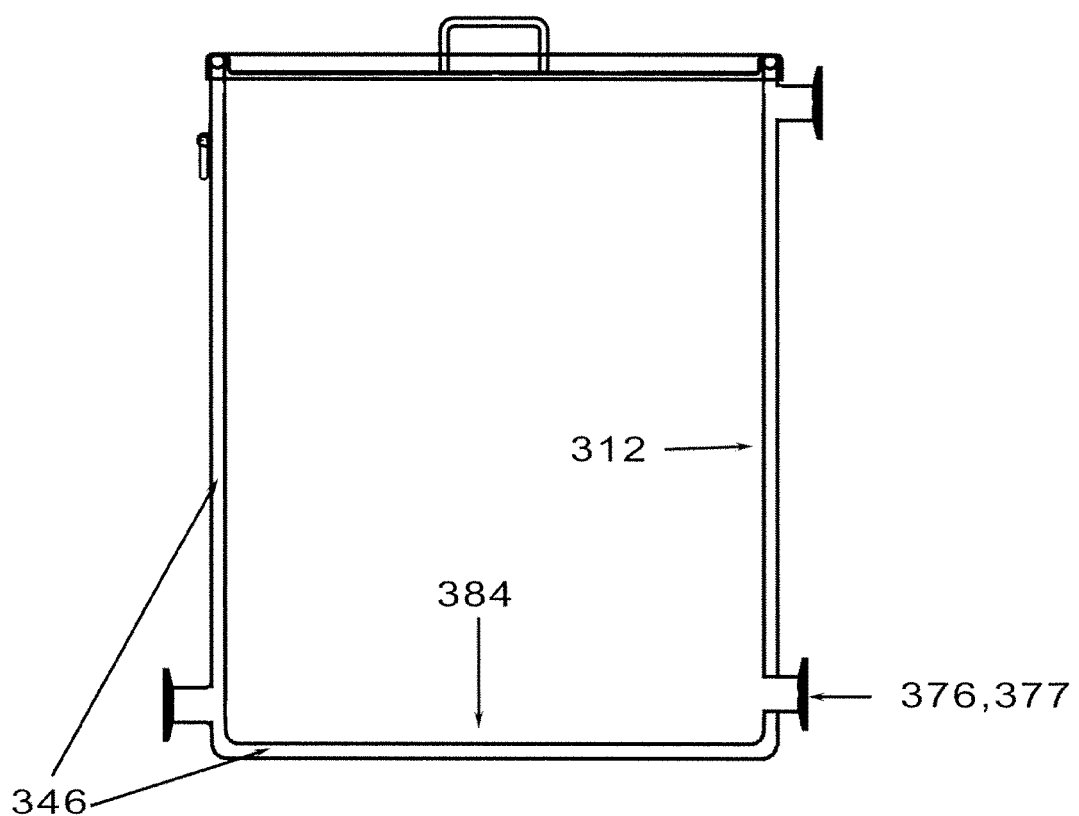
FIG. 7 is a cross-sectional view of a boil kettle with an outer wall, or jacket, on the sides and bottom of the vessel for the cooling of liquid.

FIG. 7 demonstrates how the cavity 346 could envelope, or substantially or completely surround, the sides 312 and bottom 384 of the boil kettle. This would result in more efficient cooling as the chilling media would envelope the sides 312 and bottom 384 of the boil kettle. Ports 376, 377 could be added for the removal of wort and/or the insertion of a heating element to boil the wort.

Figure 8:
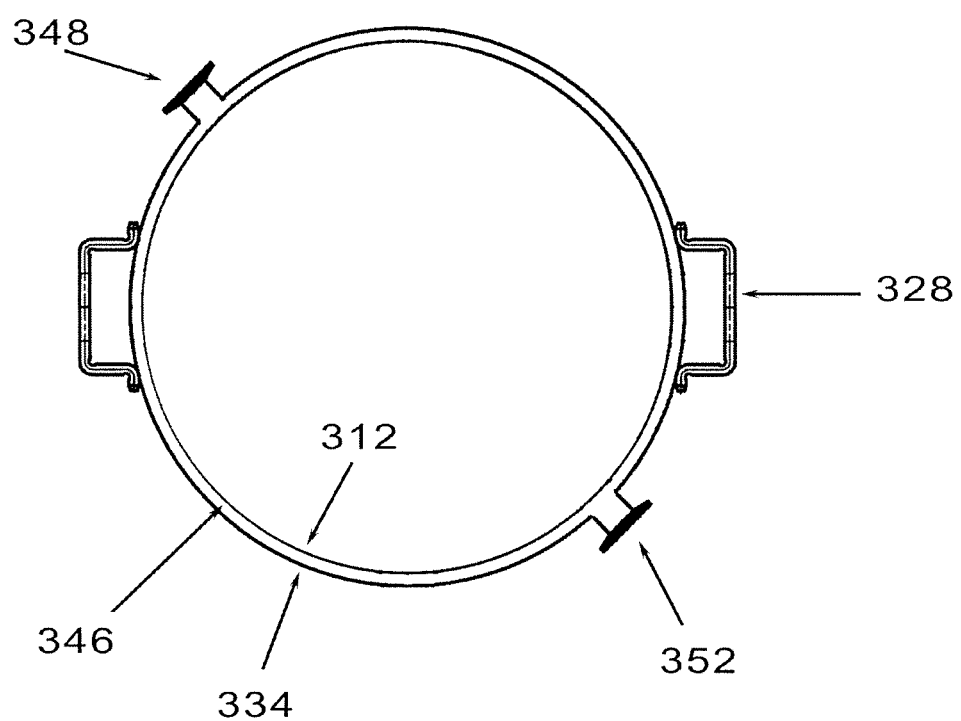
FIG. 8 is a top view of a boil kettle showing the jacket on the sides of the vessel for the cooling of liquid.

FIG. 8 is a top-down perspective demonstrating how the space comprising the cavity or jacket 346 surrounds the boil kettle.

The Conical Fermenter

Figure 9:
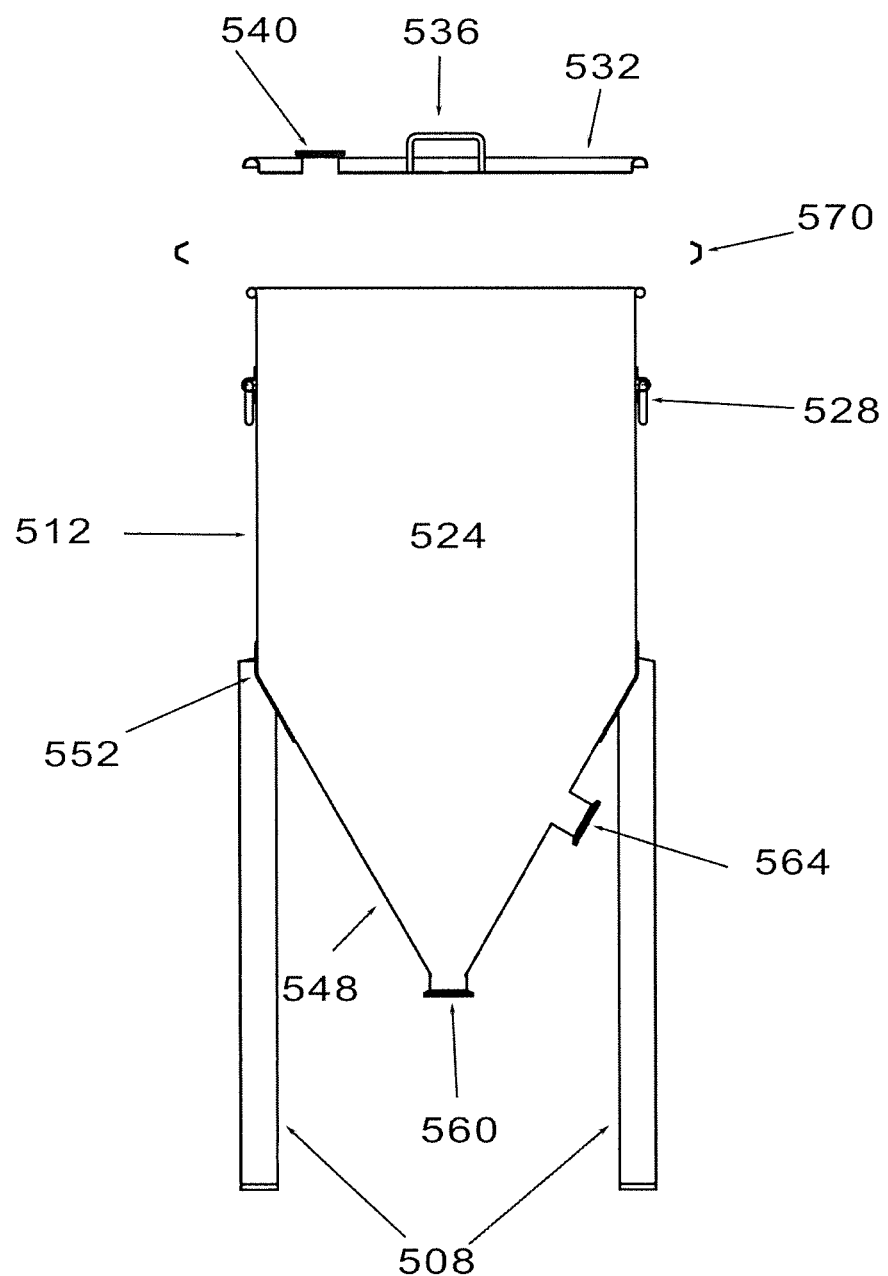
FIG. 9 is a cross-sectional view of a fermenter according to the prior art and similar in design to commercially available conical fermenters as used by brewers, particularly in the homemade or small-scale beer making industry.

FIG. 9 shows a conical fermenter, which has a construction of a rigid, heat-conductive material such as copper or stainless steel. The fermenter in this application has a cylindrical configuration including a top or lid 532 which can be of various designs such as domed or flat and various sizes, and a handle 536 attached to the lid 532. The lid 532 should form a tight closure with the side wall structure 512 of the fermenter to create a sealed cavity, and the sealed cavity can be maintained by the use of a clamping system 570 which holds the lid tight to the vessel. The lid typically has a port 540 for the controlled exit of gases from the fermenter, produced during fermentation. The fermenter has a side wall structure 512 and a conical-shaped bottom 548 with a radiused portion 552 connecting the two. The conical bottom 548, radiused portion 552, and side wall structure 512 form a reservoir 524 which can contain wort. At the bottom of the conical portion is a port 560 for the controlled release of liquid and can also be used for the removal of proteins, yeast, and other particulate or sediment that settles during or after fermentation. The vessel often will also have handles 528 for moving the vessel and a side port 564 for the removal of beer from the fermenter once fermentation is complete. The vessel will often have a support structure 508 to hold the vessel in an upright position. This design of the fermenter is similar to the design of commercially available fermenters as used by brewers, particularly in the homemade or small-scale beer making industry.

Figure 10:
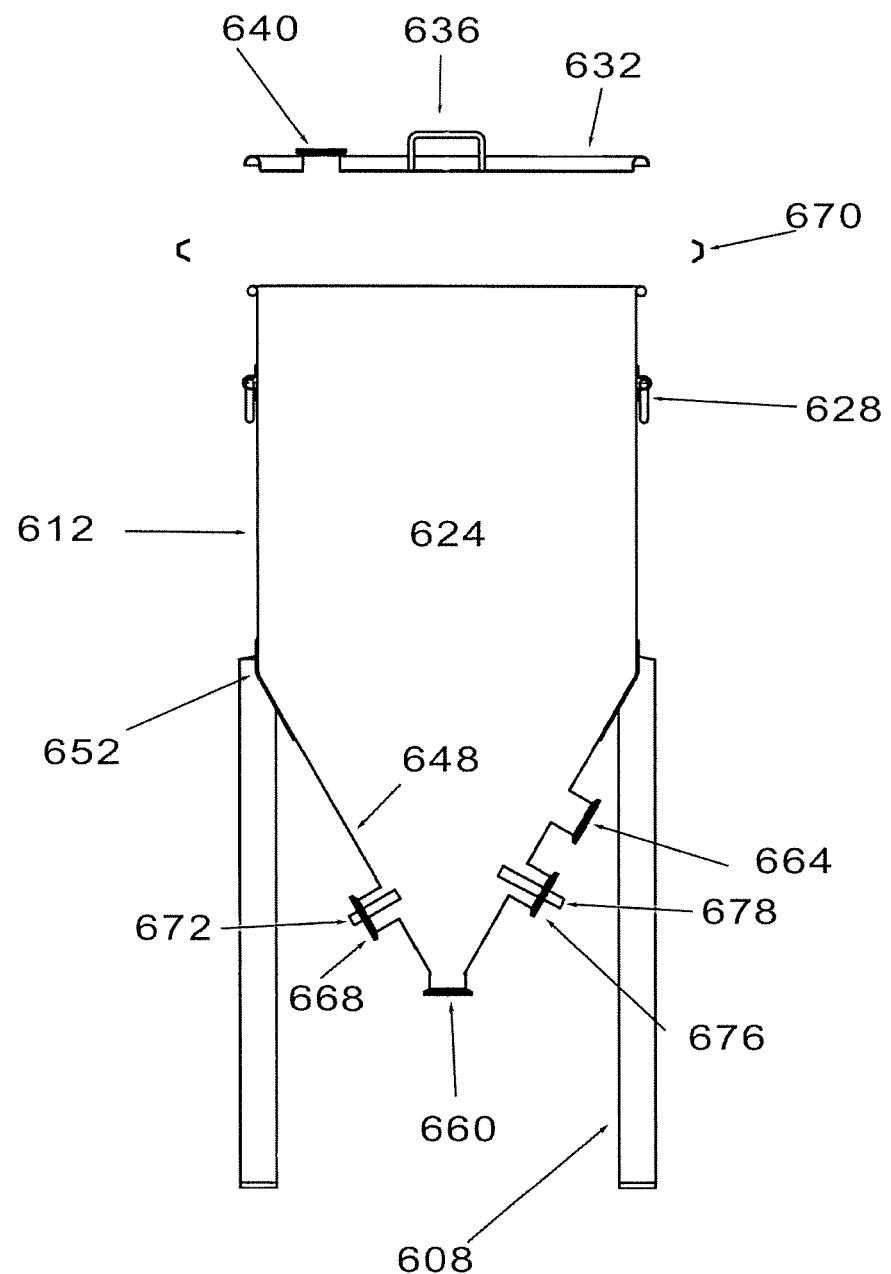
FIG. 10 is a cross-sectional view of an improved fermenter with a port for the insertion of a heating element to boil the liquid contained within the main portion of the vessel.

FIG. 10, one embodiment of the disclosure for an improved fermenter, shows a fermenter, which has a port 676 for the addition of a heating element to boil the wort. The fermenter has a construction of a rigid, heat conductive material such as copper or stainless steel. It has a cylindrical or other configuration including an opening or lid 632, which can be of various designs such as domed or flat and various sizes, and a handle 636 attached to the lid 632 can be included. The lid 632 should form a tight closure with the side wall structure 612 of the fermenter to create a sealed cavity, and the sealed cavity can be maintained by the use of a clamping system 670. There can also be a port 640 in the top for the exiting of gases produced during the fermentation period. The fermenter has a side wall structure 612 and a conical-shaped bottom 648 with a radiused portion 652 connecting the two. The conical bottom 648, radiused portion 652, and side wall structure 612 form a reservoir 624 which can contain wort. A port 676 is added in the conical portion or side of the vessel, through the conical bottom structure 648, allowing for the insertion of a heating element 678 through the vessel walls into the reservoir 624 of the vessel. At the bottom of the conical portion is a port 660 for the controlled release of liquid and can also be used for the removal of proteins, yeast, and other particulate during fermentation and after. The vessel can include a side port 664 for the removal of beer from the fermenter once fermentation is complete. This port is generally located above the level where sediment will settle in the bottom of the cone. The vessel could also have a support structure 608 to hold the vessel in an upright position and may have handles 628 to assist in moving the vessel. The vessel could also have ports 668 added for the insertion of temperature-sensing devices 672.

Figure 11:
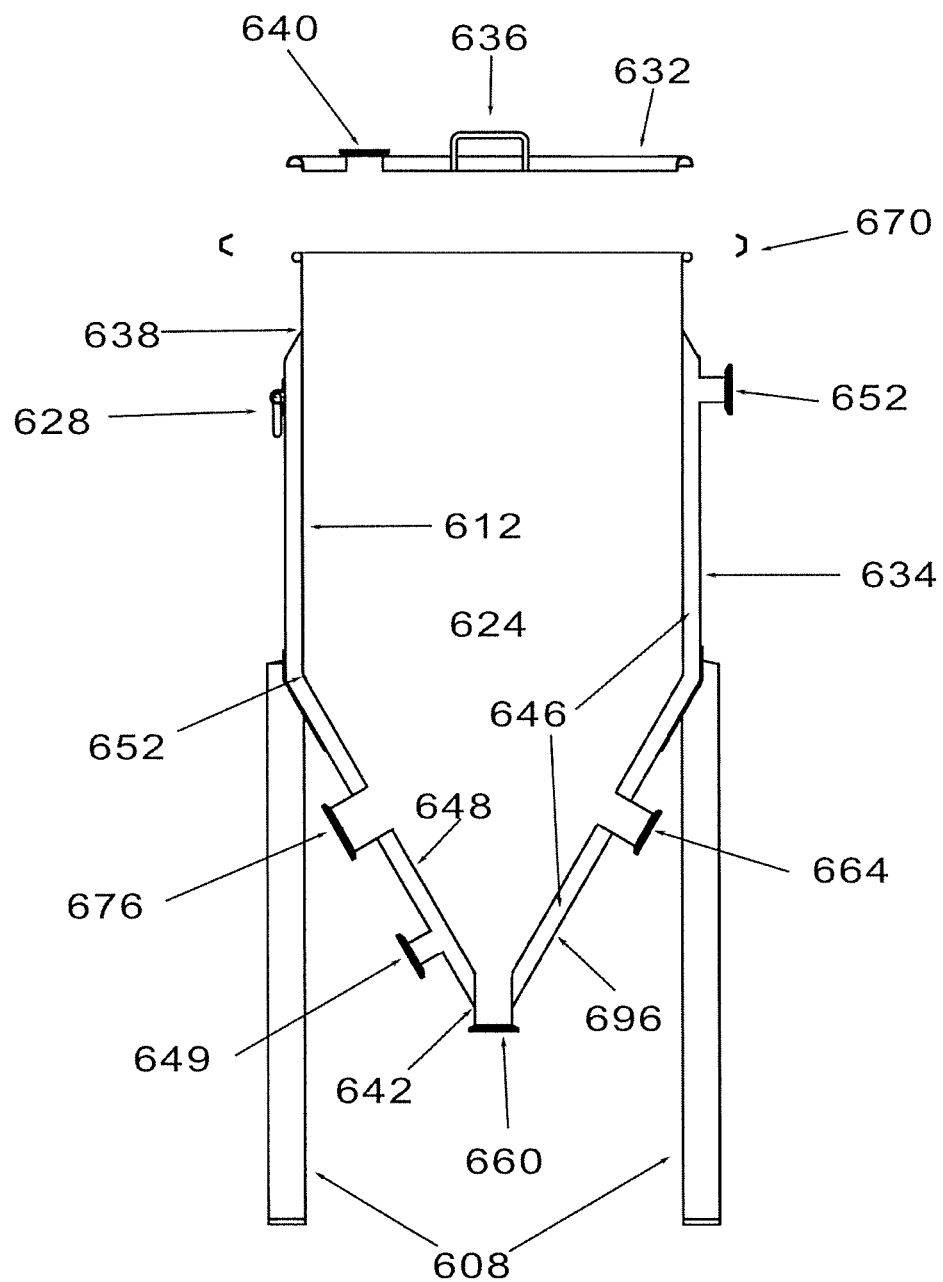
FIG. 11 is a cross-sectional view of a fermenter with a port in the cone for the insertion of a heating element to boil the liquid contained within the main portion of the vessel and an outer wall or jacket on the sides of the vessel for the cooling and or temperature regulation of liquid within the main portion of the vessel.

FIG. 11, one embodiment of the disclosure for improved fermenter, shows a fermenter, which has a port 676 for the addition of a heating element to boil the wort, and it has a jacket through which a cooling liquid can be ran for chilling the wort and regulating the temperature during fermentation. The fermenter has a construction of a rigid, heat-conductive material such as copper or stainless steel. It has a cylindrical configuration including an opening or lid 632 which can be of various designs such as domed or flat and various sizes, and a handle 636 attached to the lid 632 can be included. The lid 632 should form a tight closure with the side wall structure 612 of the fermenter to create a sealed cavity, and the sealed cavity can be maintained by the use of a clamping system 670. There can also be a port 640 in the top for the exiting of gases produced during the fermentation period. The fermenter has a side wall structure 612 and a conical-shaped bottom 648 with a radiused portion 652 connecting the two. The conical bottom 648, radiused portion 652, and side wall structure 612 form a reservoir 624 which can contain wort. Outside, and surrounding the side wall structure 612 and conical bottom 648 of the fermenter, is a second or outer side wall structure 634 that has been attached at the top 638 to the outsides of the inner side wall structure 612 and lower end 642 of conical shaped bottom 648 of the fermenter by a method such as welding. The second or outer wall 634 is of construction similar to the inner side wall structure 612 and is sealed at the top 638 and bottom 642, forming a sealed wall cavity 646 that surrounds the inner wall 612 and conical base 648. Handles 628 can be affixed to the second or outer wall structure 634 to aid in moving the structure. The second or outer side wall structure 634 and outer wall of conical base 696 is a sufficient distance from side wall structure 612 and conical base 648 to allow the easy passage of a chilling media such as water in the sealed wall cavity 646 between the inner 612 and outer 634 side wall structures and inner 648 and outer wall 696 of conical base. A width is chosen for the sealed wall cavity 646 that will allow for maximum interaction of chilling media against the inner walls 612, 648 of the cavity to provide for maximum heat transfer from wort contained in the reservoir 624 to inner walls 612, 648 to chilling media passing through the sealed wall cavity 646. The second or outer wall 634, 696 has an entry port 649 for the introduction of chilling media into the sealed wall cavity 646 and an exit port 652 for chilling media to leave the sealed wall cavity 646. The entry port 649 is typically near the bottom of the conical base along the side, and the exit port 652 typically near the top. A port 676 is added in the conical portion or side of the vessel, through both the inner 648 and outer 696 conical bottom structures, allowing for the insertion of a heating element through the vessel walls into the reservoir 624 of the vessel. At the bottom of the conical portion is a port 660 for the controlled release of liquid and can also be used for the removal of proteins, yeast, and other particulate during fermentation and after. The vessel can include a side port 664 for the removal of beer from the fermenter once fermentation is complete. The vessel could also have a support structure 608 to hold the vessel in an upright position. The vessel could also have ports added for the insertion of temperature sensing devices.

Figure 12:
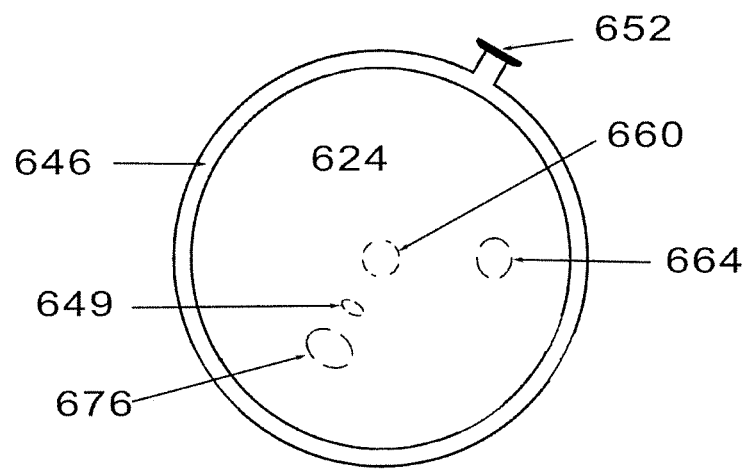
FIG. 12 is a top view of a fermenter showing the jacket on the sides of the vessel for the cooling of liquid and a port in the cone portion of the vessel for the insertion of a heating element.

FIG. 12 shows how the space comprising the sealed wall cavity 646 surrounds the improved fermenter, as well as the entry port 649 and exit port 652 for chilling media into the sealed wall cavity 646. Also is shown the location of the port 676 in the conical portion of the vessel for the insertion of a heating element. The ports on the bottom of conical portion 660 and side of conical portion 664 for the removal of liquid from the reservoir 624 are also shown.

Figure 13:
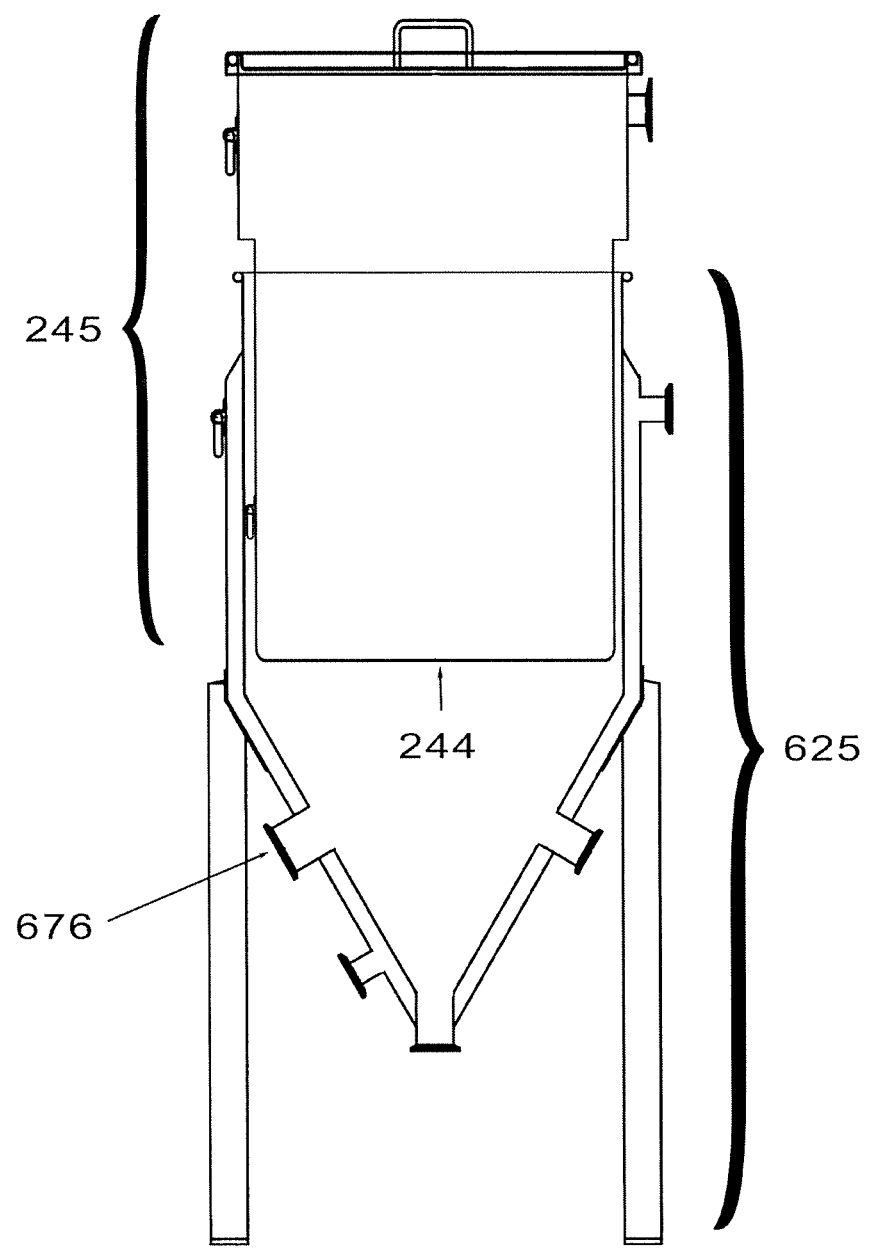
FIG. 13 is a cross-sectional view of an improved mash screen device inserted in an improved jacketed conical fermenter, with the improved mash screen device and jacketed conical fermenter being shown in cross-sectional view.

FIG. 13 demonstrates how the improved mashing device 245 can be inserted in an improved fermenter 625. Water temperature can be regulated with a heating element inserted through a port 676 under the mashing device. Grain can be easily removed from the fermenter by withdrawing the mashing device 245 once mashing is completed. As the mashing device 245 is withdrawn, wort will drain out the porous bottom 244 of the mashing device and remain in the improved fermenter 625 where it can be boiled and chilled prior to fermentation.

Figure 14:
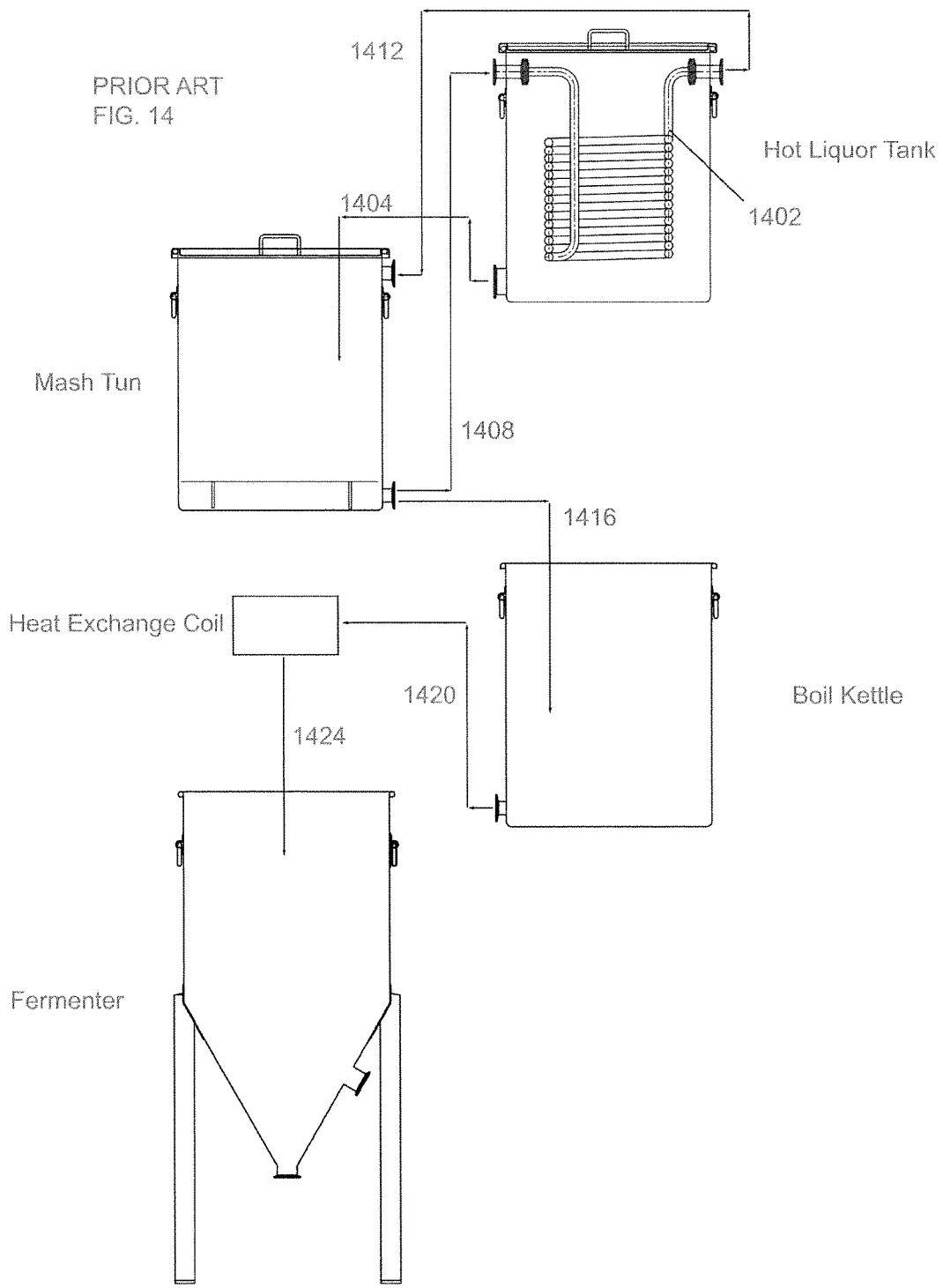
FIG. 14 is a diagram showing an overview of the steps and vessels according to the prior art and which may be used for making of a fermented beverage that are well known in the beer brewing industry, particularly in the homemade or small-scale beer making industry.

FIG. 14 demonstrates one example of a typical or traditional assembly for the production of fermented beverages such as beer as is commonly used particularly in the home-made or small-scale beer making industry. The four vessels that are often used are a hot liquor tank, mash tun, boil kettle, and fermenter. Strike and sparge water is heated in the hot liquor tank. The water temperature in the hot liquor tank is regulated to the desired temperature by a heat source in or under the hot liquor tank. Heated water or liquor 1402, for mashing is transferred to a mash tun 1404. Grain is then added to the mash tun. Enzymes interact with carbohydrates producing a sugary liquid called wort. Wort is circulated out the bottom of the mash tun (from under the mash screen which holds the grain back) 1408, through the heat exchange coil inside the hot liquor tank where it is warmed before being pumped back into the mash tun above the grain 1412. In this way the temperature of the mash is regulated. Once mashing is completed, the grain is rinsed with warm water 1404 as the wort is transferred to the boil kettle 1416. Once the boil is completed, the wort is chilled 1420, often in an external heat exchanger, as it is transferred into the fermenter 1424 where yeast is added and fermentation initiated. such as a wort.

Figure 15:
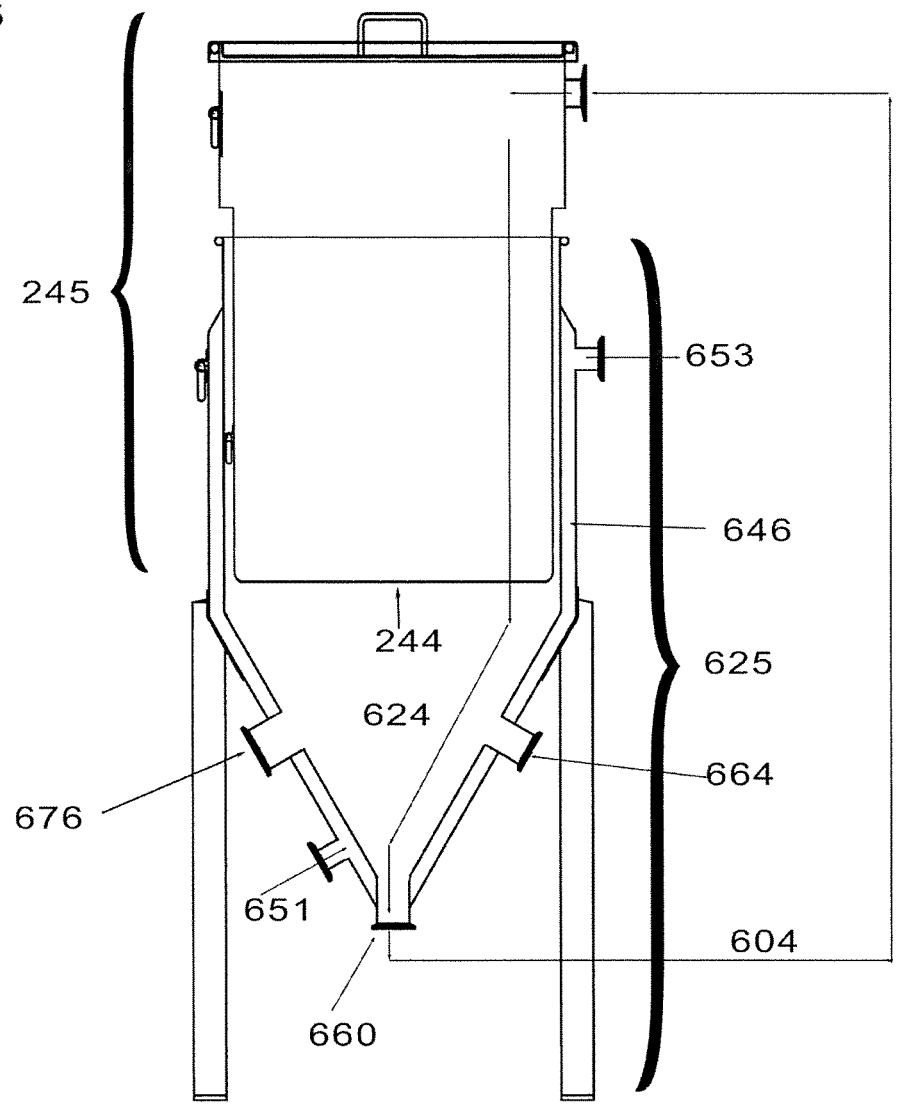
FIG. 15 is a diagram showing an overview of the steps and vessels for making of a fermented beverage as discussed in this disclosure.

FIG. 15 shows one embodiment of how the various aspects in this disclosure can be combined in one improved assembly. The mashing device 245 is inserted in the top of an improved fermenter 625. Water can be added to the improved fermenter and heated to mashing temperature with a heated element inserted through the cone 676. The heated element can be an electrical conductor and/or resistor, heated fluid, heat exchange coil, or other structure for generating infrared radiant energy. Grain is added into the improved mashing device 245. The temperature of the mash can be regulated by a heating element inserted in the fermenter 676 under the mash screen being turned on and off as needed. Once mashing is completed, the wort can be clarified by cycling the wort through the grain bed, out the porous bottom 244 of the mashing device, out the bottom of the fermenter 604, and returning it to the top of the grain inside the mashing device. Once the wort runs clear, the grain can be withdrawn by lifting the mashing device out of the fermenter. The wort can then be boiled inside the improved fermenter by heating with the element inserted in the port 676. At the end of the boil, the wort can be chilled to yeast-pitching temperature by passing a chilling media into 651 and out of 653 the sealed wall cavity 646 of the improved fermenter, or, if no sealed wall cavity 646 is present, by cycling the wort out of the improved fermenter, through an external chiller such as a plate chiller, and back in to the improved fermenter. Once the wort is chilled, the yeast can be pitched, the lid applied to the fermenter and fermentation initiated. The ports on the bottom of conical portion 660 and side of conical portion 664 for the removal of liquid from the reservoir 624 are also shown.

The exemplary systems and methods of this disclosure have been described in relation to devices for preparing beer but can be used for other types of fermented beverages, such as wine. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, the improved fermenter is not used with the improved mashing device either the improved boil kettle.

In another alternative embodiment, the improved fermenter is not used with a jacket.

In another alternative embodiment, the mashing device is not used with improved boil kettle either the improved fermenter.

In another alternative embodiment, the improved boil kettle is not used with improved mashing device either the improved fermenter.

In another alternative embodiment, the jacket is not used with improved boil kettle either the improved mashing device or fermenter.

In another alternative embodiment, the jacket is not used with improved mashing device either the improved boil kettle or fermenter.

In another alternative embodiment, a heated fluid is passed through the port 649 and reservoir 646 positioned between the inner and outer walls of the fermenter in lieu of or addition to contacting the water in the fermenter with a heating element via port 676. In other words, the reservoir 646 receives both cooling and heating media.

In another alternative embodiment, the heated and/or chilled fluid can be removed from the heating or cooling reservoir defined by the inner and outer walls and heated or cooled, respectively, by an external heater or chiller for recycle to the heating or cooling reservoir.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for brewing, comprising:
a vessel having an opening, the vessel defining a first reservoir that contains a volume of water, wherein the vessel has a conical lower region that tapers from a cylindrical upper region to distal end of the vessel;
a mash device at least partially disposed in the first reservoir and selectively removable from the first reservoir, the mash device having a porous bottom surface and a sidewall that extends from the porous bottom surface, wherein the porous bottom surface and the sidewall define a second reservoir with a top opening, and wherein the mash device is configured to receive a feed material in a volume of the second reservoir, and the porous bottom surface is configured to allow the volume of water to pass through;
a cover positioned over the opening of the vessel;
a heating port in the vessel;
a heating element positioned in the heating port to heat the water and boil wort, wherein the heating element at least partially extends into the first reservoir of the vessel below the second reservoir and extends below the porous bottom surface of the mash device;
a chilling media that cools the boiled wort by entering the first reservoir of the vessel through an entry port and at a first temperature, passing by means of a cavity in a wall of the vessel, through at least a portion of the first reservoir of the vessel, and exiting the first reservoir of the vessel at an exit port and at a second temperature, wherein, as a result of the chilling media removing heat from the boiled wort, the second temperature is higher than the first temperature, wherein the entry and exit ports are in fluid communication with the cavity.

2. The system of claim 1, wherein the conical lower region comprises a discharge port to remove particulates and a side port, positioned above the discharge port, to remove beer, wherein, in a first operating mode, the volume of water is heated by the heating element while being circulated through the feed material to form wort; in a second operating mode, the mash device is removed from the vessel and the wort is boiled by the heating element, and the boiled wort is cooled by the chilling media; and in a third operating mode, the cooled wort is fermented while in contact with yeast to form beer, and further comprising:
a pumping device configured to cycle the volume of water from a bottom end of the vessel to a top end of the vessel.

3. The system of claim 1, further comprising:
a clamping system that selectively interconnects the cover to a top edge of the vessel to close the opening in the vessel.

4. The system of claim 1, wherein the conical lower region comprises a discharge port to remove particulates and a side port, positioned above the discharge port, to remove beer and further comprising:
a sensing port in the vessel; and
a sensing device positioned in the sensing port and at least partially extending into the first reservoir of the vessel to measure the temperature of the contents of the vessel.

5. The system of claim 1, wherein the heated volume of water is a liquor configured to cycle through the first reservoir, the feed material, and the porous bottom surface of the mash device to produce the wort.

6. The system of claim 1, wherein the vessel has inner and outer wall portions that define the cavity to receive the chilling media.

7. The system of claim 6, wherein the entry port for the chilling media passes through the outer wall but not through the inner wall.

8. The system of claim 1, wherein the feed material has a larger granularity than the porous bottom surface of the mash device so that the feed material does not pass through the porous bottom surface.

9. The system of claim 1, wherein an upper portion of the vessel has a cylindrical sidewall having an inner diameter and a shoulder having an inner diameter, and wherein the mash device has a cylindrical sidewall having an outer diameter that is less than the inner diameter of the sidewall of the vessel and greater than the inner diameter of the shoulder of the vessel so that the mash device rests on the shoulder of the vessel.

10. A system for brewing, comprising:
a vessel having an opening, the vessel defining a first reservoir having a cylindrical upper region and a conical lower region that tapers from the cylindrical upper region to a distal end of the vessel, the first reservoir cantaining a volume of water, wherein the conical lower region comprises a discharge port to remove particulates and a side port, positioned above the discharge port, to remove beer;
a mash device removably disposed in the cylindrical upper region of the first reservoir and selectively removable from the first reservoir, the mash device having a porous bottom surface and a sidewall that extends from the porous bottom surface, wherein the porous bottom surface and the sidewall define a second reservoir with a top opening, the porous bottom surface is configured to allow the volume of water to pass through;
a feed material positioned in a volume of the second reservoir of the mash devices;
a cover positioned over the opening of the vessel;
a heating port in the vessel;
a heating element positioned in the heating port for heating the volume of water and wort, wherein the heating element at least partially extends into the first reservoir of the vessel below the second reservoir and extends below the porous bottom surface of the mash device;
a sensing port in the vessel;
a sensing device positioned in the sensing port and at least partially extending into the first reservoir of the vessel to measure the temperature of the contents of the vessel;
a chilling media that enters the first reservoir of the vessel at a first temperature, passes through at least a portion of the first reservoir of the vessel, and exits the first reservoir of the vessel at a second temperature, wherein the second temperature is higher than the first temperature, the chilling media configured to cool the boiled wort.

11. The system of claim 10, wherein the heating element heats the volume of water in conact with feed material to produce the wort, and the mash device is configured to be removed from the vessel so that the heating element boils the wort and further comprising:
a pumping device configured to cycle the volume of water from a bottom end of the vessel to a top end of the vessel.

12. The system of claim 10, wherein the discharge port is positioned at the distal end of the vessel, wherein the cooled wort is fermented in the vessel while in contact with yeast to form the beer, and the discharge port is configured to selectivey release particulates formed during fermentation and further comprising:
a clamping system that selectively interconnects the cover to a top edge of the vessel to close the opening in the vessel.

13. The system of claim 10, wherein the heated volume of water is a liquor configured to cycle through the first reservoir, the feed material, and the porous bottom surface of the mash device to produce the wort.

14. The system of claim 10, wherein the chilling media enters the first reservoir of the vessel through an entry port, passes, by means of a cavity in a wall of the vessel, through the at least a portion of the first reservoir of the vessel, and exits the first reservoir of the vessel at an exit port, wherein the entry and exit ports are in fluid communication with the cavity, and wherein the wall of the vessel comprises inner and outer wall portions that define the cavity to receive the chilling media.

15. The system of claim 14, wherein the entry port for the chilling media passes through the outer wall but not through the inner wall.

16. The system of claim 10, wherein the feed material has a larger granularity than the porous bottom surface of the mash device so that the feed material does not pass through the porous bottom surface.

17. The system of claim 10, wherein the vessel has a cylindrical sidewall positioned above the conical lower section and having an inner diameter and a shoulder having an inner diameter, and wherein the mash device has a cylindrical sidewall having an outer diameter that is less than the inner diameter of the sidewall of the vessel and greater than the inner diameter of the shoulder of the vessel so that the mash device rests on the shoulder of the vessel.

18. A system for brewing, comprising:
- a vessel having an opening, the vessel defining a first reservoir that contains a volume of water, wherein the vessel has a conical lower region that tapers from a cylindrical upper region to a distal end of the vessel, wherein the conical lower region comprises a discharge port to remove particulates and a side port, positioned above the discharge port, to remove beer;
- a mash device at least partially disposed in the first reservoir and selectively removable from the first reservoir, the mash device having a porous bottom surface and a sidewall that extends from the porous bottom surface, wherein the porous bottom surface and the sidewall define a second reservoir with a top opening, and wherein the mash device is configured to receive a feed material in a volume of the second reservoir, and the porous bottom surface is configured to allow the volume of water to pass through; a cover positioned over the opening of the vessel; a heating port in the vessel;
- a heating element positioned in the heating port to heat the water and boil wort; a sensing port in the vessel, wherein the heating element at least partially extends into the first reservoir of the vessel below the second reservoir and extends below the porous bottom surface of the mash device;
- a sensing device positioned in the sensing port and at least partially extending into the first reservoir of the vessel to measure the temperature of the contents of the vessel;
- entry and exit ports through the vessel, wherein the entry and exit ports enable a chilling media to cool the boiled wort.

19. The system of claim 18, further comprising:
- a cavity of the vessel at least partially defined by an inner wall and an outer wall, wherein the entry and exit ports are in fluid communication with the cavity, and wherein the chilling media passes through the entry port and into the cavity at a first temperature and passes through the exit port and out of the cavity at a second temperature, wherein, as a result of the boiled wort heating the chilling media through the inner wall, the second temperature is higher than the first temperature.

* * * * *

UNITED STATES PATENT AND TRADEMARK OFFICE
CERTIFICATE OF CORRECTION

| | | |
|---|---|---|
| PATENT NO. | : 9,868,928 B2 | |
| APPLICATION NO. | : 14/266369 | |
| DATED | : January 16, 2018 | |
| INVENTOR(S) | : Nathan Robert Janz | |

It is certified that error appears in the above-identified patent and that said Letters Patent is hereby corrected as shown below:

In the Claims

Claim 2, Column 15, Line 31: delete "veast" and insert --yeast--.

Claim 10, Column 16, Line 9: delete "cantaining" and insert --containing--.

Claim 10, Column 16, Line 23: delete "devices" and insert --device--.

Claim 11, Column 16, Line 45: delete "conact" and insert --contact--.

Claim 12, Column 16, Line 56: delete "selectivey" and insert --selectively--.

Claim 14, Column 17, Line 1: delete "the at least a portion" and insert --at least a portion--.

Claim 18, Column 17, Line 30 to Column 18, Line 14 delete:
"a mash device at least partially disposed in the first reservoir and selectively removable from the first reservoir, the mash device having a porous bottom surface and a sidewall that
extends from the porous bottom surface, wherein the porous bottom surface and the sidewall define a second reservoir with a top opening, and wherein the mash device is configured to receive a feed material in a volume of the second reservoir, and the porous bottom surface is configured to allow the volume of water to pass through; a cover positioned over the opening of the vessel; a heating port in the vessel;
a heating element positioned in the heating port to heat the water and boil wort; a sensing port in the vessel, wherein the heating element at least partially extends into the first reservoir of the vessel below the second reservoir and extends below the porous bottom surface of the mash device;"
And insert:
--a mash device at least partially disposed in the first reservoir and selectively removable from the first reservoir, the mash device having a porous bottom surface and a sidewall that extends from the porous bottom surface, wherein the porous bottom surface and the sidewall define a second reservoir with a top opening, and wherein the mash device is configured to receive a feed material in a volume of the Signed and Sealed this
Fifth Day of June, 2018

Andrei Iancu
*Director of the United States Patent and Trademark Office*

CERTIFICATE OF CORRECTION (continued)
U.S. Pat. No. 9,868,928 B2 second reservoir, and the porous bottom surface is configured to allow the volume of water to pass through;
a cover positioned over the opening of the vessel;
a heating port in the vessel;
a heating element positioned in the heating port to heat the water and boil wort, wherein the heating element at least partially extends into the first reservoir of the vessel below the second reservoir and extends below the porous bottom surface of the mash device;
a sensing port in the vessel;--